(12) United States Patent
Yoshino

(10) Patent No.: US 8,345,143 B2
(45) Date of Patent: Jan. 1, 2013

(54) IMAGE CAPTURING APPARATUS AND IMAGE CAPTURING APPARATUS CONTROL METHOD

(75) Inventor: Eiji Yoshino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 12/797,424

(22) Filed: Jun. 9, 2010

(65) Prior Publication Data

US 2010/0315542 A1 Dec. 16, 2010

(30) Foreign Application Priority Data

Jun. 15, 2009 (JP) ................................. 2009-142720

(51) Int. Cl.
*H04N 5/222* (2006.01)
*H04N 5/232* (2006.01)
*G03B 13/00* (2006.01)

(52) U.S. Cl. ......... 348/333.09; 348/333.02; 348/333.05; 348/346

(58) Field of Classification Search ............. 348/333.01, 348/333.02, 333.05, 333.08, 333.09, 346
See application file for complete search history.

(56) References Cited

U.S. PATENT DOCUMENTS 8,184,192 B2 * 5/2012 Sakaguchi ............... 348/333.05
2001/0043279 A1 * 11/2001 Niikawa et al. ............... 348/335

FOREIGN PATENT DOCUMENTS

JP 2003-32521 1/2003

* cited by examiner

*Primary Examiner* — Daniel M Pasiewicz
(74) *Attorney, Agent, or Firm* — Canon USA Inc. IP Division

(57) ABSTRACT

An image capturing apparatus has either one of a first display mode for continuously displaying a captured image on an image display unit and a second display mode for not displaying the captured image on the image display unit and displays an image according to the detection result on the image display unit when the second display mode is set.

17 Claims, 7 Drawing Sheets

IMAGE CAPTURING APPARATUS AND IMAGE CAPTURING APPARATUS CONTROL METHOD

BACKGROUND OF THE INVENTION

1. Field of the Invention

The present invention relates to an image capturing apparatus having a display mode for not displaying a captured image on an image display unit during a standby state before a photograph is taken.

2. Description of the Related Art

A conventional image capturing apparatus such as a digital camera is capable of continuously displaying an image signal from an image sensor on a liquid crystal display (LCD) or the like during a standby state before a photograph is taken. Therefore, a user performs framing while confirming a field angle displayed on the LCD and can press a shutter button at a desired field angle and a timing.

Meanwhile, when the user presses the shutter button, a photographing processing is performed after an automatic focus (AF) processing, an automatic exposure (AE) processing, an automatic white balance (AWB) processing, an electronic flash pre-emission (EF) processing, and the like. Therefore, there is a time lag from the timing at which the user actually desires to take a photograph. Accordingly, there may be considered a method for shortening a time required for the AF processing which is performed after the shutter button is pressed down, wherein a certain degree of focusing is performed by continuously performing the AF processing during the standby state before photographing.

In the case of continuously performing the AF processing in the standby state before photographing, it is necessary to take a countermeasure against significant disturbance of a captured image displayed on the LCD. An image capturing apparatus discussed in Japanese Patent Application Laid-Open No. 2003-32521 does not perform update of an LDC display when a focus evaluation value is low to prevent the defocused image from being viewed by a user. Also, as another countermeasure, there has been known a method wherein an image capturing apparatus restricts an operation speed and a range of a focus lens. In the case of restricting the operation speed and the range of the focus lens, the time required for performing the AF processing which is performed after the shutter button is pressed down is not usually shortened since it is difficult to continuously maintain a perfect focus.

Therefore, a camera is known which has a function of shortening the time required for the AF processing after the shutter button is pressed down. In this camera, the LCD display is not performed during the standby state before photographing and focusing is continuously maintained without restricting the operation speed and the range of the focus lens. This function is referred to as "quick photographing", and a mode for performing the quick photographing is referred to as "quick photographing mode". In the case of taking a photograph by the quick photographing mode, a user mainly uses an optical view finder for performing framing since an image signal from the image sensor is not displayed on the LCD.

As described above, the user performs the framing by mainly using the optical view finder in the quick photographing mode. Therefore, there is a problem that the user cannot confirm information such as face information detected by the camera and a focus position, that has conventionally been obtained from a captured image displayed on the LCD.

In view of the above-described problems, the present invention enables a user to recognize an image capture state of an object even if a mode of continuously displaying an image on an image display unit is not selected.

SUMMARY OF THE INVENTION

According to an aspect of the present invention, an image capturing apparatus includes an image capturing unit configured to capture an image of an object; a display control unit configured to display the image captured by the image capturing unit on an image display unit; a detection unit configured to detect a specific object from the image captured by the image capturing unit; and a mode setting unit configured to set either one of a first display mode for continuously displaying the captured image on the image display unit by the display control unit and a second display mode for not displaying the captured image on the image display unit, wherein the display control unit displays an image according to the detection result obtained by the detection unit on the image display unit in a case where the second mode is set by the mode setting unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
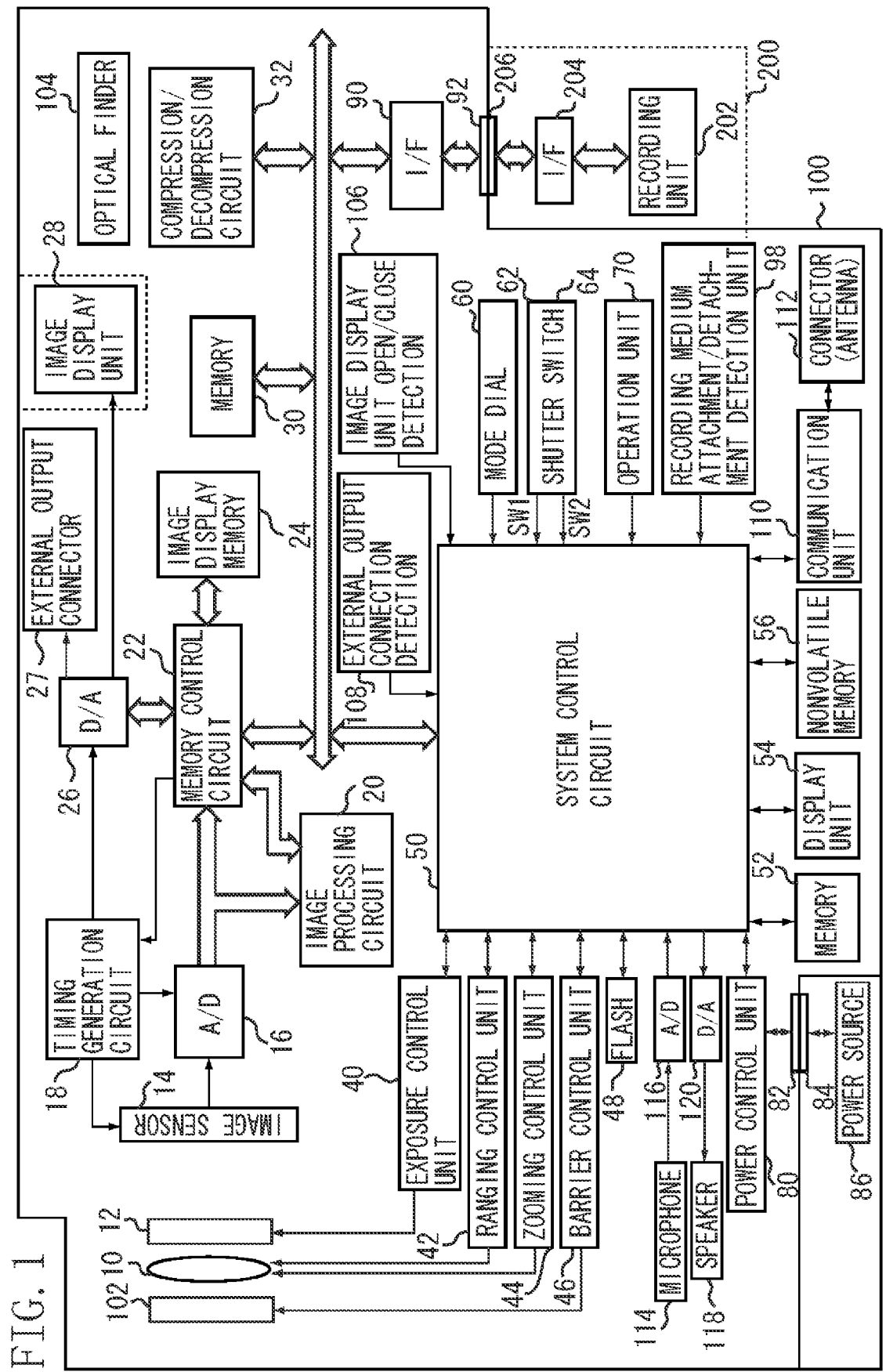
FIG. 1 is a diagram illustrating a structure of an image capturing apparatus according to a first exemplary embodiment.

FIG. 1 is a diagram illustrating a structure of a camera which is an image capturing apparatus of a first exemplary embodiment. The camera 100 includes an image capturing lens 10 including a focus lens, a shutter 12 provided with an aperture function, an image sensor 14 for converting an optical image into an electric signal, an analog/digital (A/D) convertor 16 for converting an analog signal output from the image sensor 14 into a digital signal, and a timing generation circuit 18. The timing generation circuit 18 is controlled by a memory control circuit 22 and a system control circuit 50 and supplies a clock signal and a control signal to the image sensor 14, the A/D convertor 16, and a digital/analog (D/A) convertor 26.

The camera 100 includes an image processing circuit 20, the memory control circuit 22, an image display memory 24, the D/A convertor 26, an external output connector 27, an image display unit 28, and the system control circuit 50.

The image processing circuit 20 performs predetermined image interpolation and color conversion on data from the A/D convertor 16 or data from the memory control circuit 22. Also, the image processing circuit 20 performs predetermined calculation using captured image data. Based on a result of the calculation, the system control circuit 50 performs AF processing of a through-the-lens (TTL) method, AE processing, and EF processing for performing control on an exposure control unit 40 and a ranging control unit 42. Further, the image processing circuit 20 performs predetermined calculation using captured image data to perform an AWB processing of the TTL method based on a result of the calculation.

The memory control circuit 22 controls the A/D convertor 16, the timing generation circuit 18, the image processing circuit 20, the image display memory 24, the D/A convertor 26, a memory 30, and a compression/decompression circuit 32. Data converted by the A/D convertor 16 are written into the image display memory 24 or the memory 30 directly or via the image processing circuit 20 and the memory control circuit 22.

The external output connector 27 outputs data converted by the D/A convertor 26 to an external monitor. When a connector is inserted into the external output connector 27, the system control circuit 50 recognizes an external output state by an external output connector connection detection unit 108 described below in this specification.

The image display unit 28 is, for example, a TFT LCD. Image data to be displayed, which have been written into the image display memory 24, are displayed by the image display unit 28 via the D/A convertor 26. It is possible to realize an electronic finder function by using the image display unit 28 for continuously displaying the captured image data. Also, the image display unit 28 is capable of arbitrarily switching between on and off of the display according to an instruction from the system control circuit 50, and it is possible to largely reduce electric consumption of the camera 100 when the display is switched off. Further, the image display unit 28 is coupled to a main body of the camera 100 by a rotatable hinge part, thereby enabling a user to use the electronic finder function, a reproduction display function, and various display functions by freely setting a direction and an angle.

Also, it is possible to stash the image display unit 28 with a display part of the image display unit 28 facing to the camera 100, and, in this case, an image display unit open/close detection unit 106 described below stops a display operation of the image display unit 28 by detecting the stash state with the system control circuit 50. The system control circuit 50 controls the entire camera 100.

Further, the cameral 100 includes the memory 30, the compression/decompression circuit 32, the exposure control unit 40, the ranging control unit 42, a zooming control unit 44, a barrier control unit 46, a flash 48, a memory 52, and a display unit 54.

The memory 30 stores data such as a captured still image and a moving image. The memory 30 is provided with a storage capacity that is sufficient for storing data of a predetermined number of still images and a predetermined time of moving image and enables high speed and large amount image writing in the case of serial image capturing for capturing a plurality of still images and panoramic image capturing. Also, the memory 30 may be used as a work area of the system control circuit 50 or a write buffer of a recording medium 200.

The compression/decompression circuit 32 performs compression/decompression of image data by way of adaptive discrete cosine transform (ADCT) and the like. The compression/decompression circuit 32 reads image data stored in the memory 30 to perform compression processing or a decompression processing and writes the data after the processing into the memory 30. The exposure control unit 40 controls the shutter 12 that is provided with the aperture function. Also, the exposure control unit 40 achieves a flash dimmer function in cooperation with the flash 48. The ranging control unit 42 controls focusing of the image capturing lens 10. The zooming control unit 44 controls zooming of the image capturing lens 10. The barrier control unit 46 controls operations of a protection unit 102 which serves as a barrier.

The exposure control unit 40 and the ranging control unit 42 are controlled by employing the TTL method, and the system control circuit 50 performs control on the exposure control unit 40 and the ranging control unit 42 based on a result of calculation of captured image data performed by the image processing circuit 20. The flash 48 has an AF fill light projecting function and the flash light dimmer function.

The memory 52 stores a constant, a variable, a program, and the like for an operation of the system control circuit 50.

The display unit 54 is a liquid crystal display device that displays an operation state, a message, and the like by using a character, an image, a voice, and the like according to execution of a program in the system control circuit 50. The display unit 54 is provided alone or a plurality of the display units 54 is provided at a position that is easily recognized and in the vicinity of an operation unit of the camera 100. The display unit 54 is formed of, for example, a combination of an LCD, a light-emitting diode (LED), a sound element.

Also, a part of the functions of the display unit 54 is provided inside the optical finder 104. Among the display contents of the display unit 54, those displayed on the LCD or the like are a single shot/serial photographing display, a self timer display, a compression ratio display, a recording pixel number display, a display of number of recorded photographs, a display of number of photographs that can be taken, a shutter speed display, an aperture value display, and an exposure correction display. Other examples of the display contents include a flash display, a red eye reduction display, a macro photography display, a buzzer setting display, a clock battery level display, an error display, an information display using a plurality of digits, a display of attachment/removal state of a recording medium 200, a communication I/F operation display, a date and time display, and the like. Also, among the contents of the display unit 54, those displayed in the optical finder 104 include a focus display, a camera-shake warning display, a flash charge display, a shutter speed display, an aperture value display, an exposure correction display, and the like.

The camera 100 includes a nonvolatile memory 56, a mode dial switch 60, shutter switches 62 and 64, the operation unit 70, a power control unit 80, connectors 82 and 84, a power unit 86, an interface 90, a connector 92, and a recording medium attachment/removal detection unit 98.

The nonvolatile memory 56 is a memory that is capable of electrically erasing and recording, such as an electrically erasable programmable read-only memory (EEPROM). The mode dial switch 60, the shutter switch (SW1) 62, the shutter switch (SW2) 64, and the operation unit 70 form an operation unit for a user to input various operation instructions into the system control circuit 50. The operation unit is formed of one of or a combination of two or more of a switch, a dial, a touch panel, pointing by line-of-sight detection, a voice recognition device, and the like.

Hereinafter, the operation unit will specifically be described.

The mode dial switch 60 is capable of switching and setting function modes such as power-off, an automatic photographing mode, image capturing modes (including live view photographing mode, quick photographing mode, moving image capturing mode), a replay mode, a multi screen replay/erase mode, and a PC connection mode. The live view photographing mode of the image capturing modes realizes the above-mentioned electronic finder function for continuously displaying captured image data on the image display unit 28 (a captured image display mode, a first display mode). A region of the captured image data to be displayed is a region that can be read from the image sensor 14, which corresponds to a region in FIG. 2B or FIG. 3B described below, for example.

The shutter switch (SW1) 62 is turned on during operation on the shutter button to give instructions for starting operations such as the AF processing, the AE processing, the AWB processing, and the EF processing.

The shutter switch (SW2) 64 is turned on when the operation on the shutter button is completed to give instructions for staring operations of a series of photographing processing steps. The photographing processing means exposure processing for writing the signal read from the image sensor 14 as the image data, into the memory 30 via the A/D convertor 16 and the memory control circuit 22, and development processing utilizing the calculations by the image processing circuit 20 and the memory control circuit 22. Further, recording processing for reading the image data from the memory 30, performing the compression by the compression/decompression circuit 32, and writing the image data into the recording medium 200 are included in the photographing processing. Also, the shutter switch (SW2) 64 instructs start/stop in the case of the moving image capturing.

The operation unit 70 is formed of various buttons, a touch panel, and the like and includes a menu button, a set button, a macro button, a multi-screen reproduction and page-advance button, a flash setting button, and a single photographing/serial photographing/self timer switching button. Examples of other buttons include a menu change + (plus) button, a menu change − (minus) button, a replayed image change + (plus) button, a replayed image change − (minus) button, an imaging quality selection button, an exposure correction button, and a date/time setting button.

The power control unit 80 includes a battery detection circuit, a DC-CD convertor, and a switching circuit for switching blocks to be energized. The power control unit 80 performs detection of absence/presence of a battery, a type of battery, and a battery level and controls the DC-CD convertor based on the detection results and instructions from the system control circuit 50, thereby supplying a required voltage to each of the units including the recording medium for a required time period.

The power unit 86 is a primary battery such as an alkali battery and a lithium battery, a secondary battery such as a NiCd battery, a NiMH battery, a Li battery, and an AC adaptor. The interface 90 controls connection with the recording medium 200 such as a memory card and a hard disk. The connector 92 performs connection with the recording medium 200. The recording medium attachment/removal detection unit 98 detects whether the recording medium 200 is attached to the connector 92.

In the present exemplary embodiment, a system of the interface and the connector for attaching the recording medium 200 is single. However, the number of systems of the interface and the connector for attaching the recording medium 200 may be one or more. Also, an interface and a connector of different standards may be adopted in combination.

Examples of the interface and the connector include a Personal Computer Memory Card International Association (PCMCIA) card, and a compact flash (CF; registered trade name) that are in conformity with the standard. In such a case, it is possible to connect various communication cards such as a LAN card, a modem card, a USB card, an IEEE1394 card, a P1284 card, a small computer system interface (SCISI) card, and a communication card such as personal handy phone system (PHS). Thus, it is possible to mutually transfer image data and controlled information belonging to the image data with other computers and peripheral devices such as a printer.

The camera 100 includes the protection unit 102, the optical finder 104, the image display unit open/close detection unit 106, the external output connector connection detection unit 108, a communication unit 110, a connector 112, a microphone 114, an A/D convertor 116, a speaker 118, and a D/A convertor 120. The protection unit 102 covers the image capturing unit including the image capturing lens 10 of the camera 100 to prevent contamination and breakage of the image capturing unit and thus serves as a barrier. The optical finder 104 enables a user to perform image capturing without using the electronic finder function of the image display unit 28. Also, in the optical finder 104, a part of the functions of the display unit 54, such as a focus display, a camera-shake warning display, a flash charge display, a shutter speed display, an aperture value display, and an exposure correction display are disposed.

The image display unit open/close detection unit 106 detects whether the image display unit 28 is in the stash state with the display surface of the image display unit 28 facing to the camera 100. When the stash state of the image display unit 28 is detected, the display operation of the image display unit 28 is stopped to reduce power consumption.

The external output connector connection detection unit 108 detects whether an external monitor is connected to the external output connector 27. If the connection state is detected, it is possible to use the external monitor as the display device in place of the image display unit 28. The communication unit 110 has various communication functions such as communication by RS232C, universal serial bus (USB), IEEE1394, P1284, SCSI, a modem, a LAN, and wireless communitarian. The connector 112 connects the camera 100 to another device using the communication unit 110. In the case of the wireless communication, the connector 112 is an antenna.

The microphone 114 obtains voice data. The A/D convertor 116 performs A/D conversion on the voice data obtained by the microphone 114 so that the system control circuit 50 can obtain the data. The speaker 118 performs voice data reproduction. The D/A convertor 120 performs D/A conversion on the digital voice data output from the system control circuit 50 so that the voice data are reproduced by the speaker 118.

The recording medium 200 is inserted into the camera 100. The recording medium 200 is a memory card, a hard disk, or the like. The recording medium 200 is provided with a recording unit 202 formed of a semiconductor memory, a magnetic disk, or the like, an interface 204 with the camera 100, and a connector 206 performing connection with the camera 100. When the recording medium 200 is a PC-Card or a CF card of the PCMCIA standard, an information storage circuit storing its performance is sometimes incorporated therein.

Hereinafter, an operation processing when the camera 100 is set to the quick photographing mode will be described.

When a user switches to the quick photographing mode by operating the mode dial switch 60, the system control circuit 50 sets the camera to the quick photographing mode as the image capturing mode. This processing corresponds to one example of processing by the mode setting unit. Also, the system control circuit 50 stops display of captured image data on the image display unit 28. In other words, the quick photographing mode is a mode (a captured image non-display mode, a second display mode) in which the captured image is not displayed on the image display unit 28. Further, the system control circuit 50 performs the AF processing that does not restrict an operation speed and a range of the focus lens. With such operations, it is possible to continuously maintain focusing during a standby state before a photograph is taken, thereby shortening a time lag from the pressing down of the shutter button by the user to the photographing processing.

However, in the conventional quick photographing mode, the user cannot confirm the information such as face information and a focus position detected by the system control circuit 50, which is obtained from the captured image displayed on the image display unit 28. Hereinafter, with reference to FIGS. 2 and 3, the quick photographing mode in which it is impossible to confirm the face information, the focus position, and the like will be described.

Figure 2A:
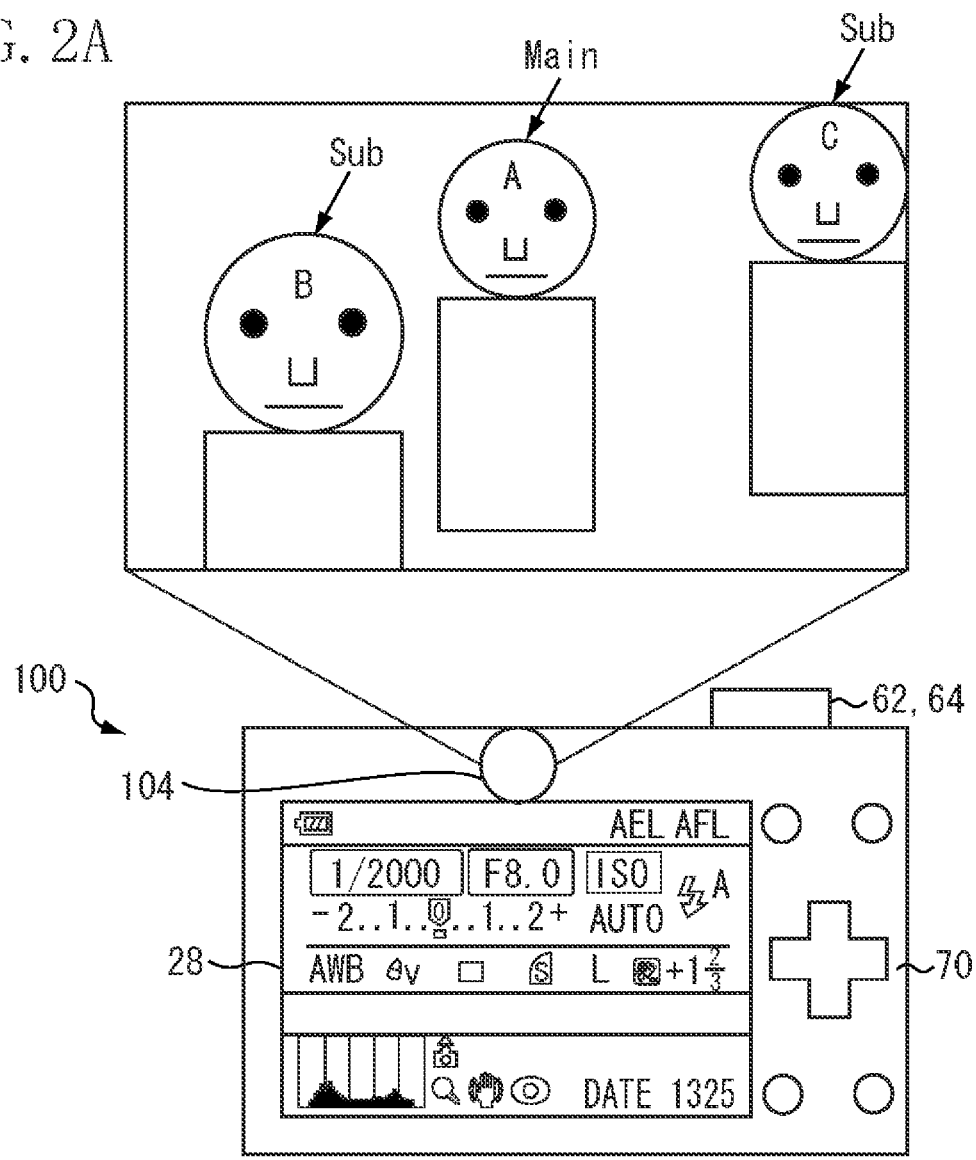
FIGS. 2A and 2B are schematic diagrams illustrating one example of photographing operation in a quick photographing mode.

Illustrated in FIG. 2A is the image display unit 28 of the camera 100. The shutter speed, the aperture value, and the like set in the camera 100 are displayed on the image display unit 28, and the captured image data are not displayed. It is assumed that the user presses the shutter button after confirming three persons of a person A, a person B, and a person C in a frame by using the optical finder 104. In this case, it is assumed that the user considers a face of the person A as a face to preferentially focus on for taking a photograph.

Figure 2B:
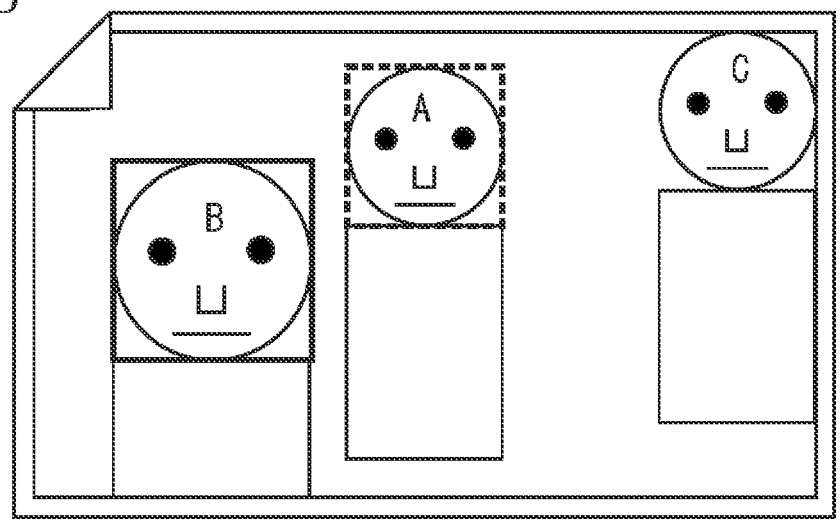

Illustrated in FIG. 2B is image data indicating the faces of the persons actually detected by the system control circuit 50 when the photograph is taken. In FIG. 2B, a region of the face (main face) on which the preferential focusing is performed is indicated by a solid line, while the face on which the preferential focusing is not performed is indicated by a broken line.

As illustrated in FIG. 2B, the system control circuit 50 detects the face that is not the face which the user desires to preferentially photograph and, further, does not detect the face of the person C. In other words, the user has to take the photograph without confirming the result of the detection by the system control circuit 50 even when the face that the system control circuit 50 focuses on is not the face intended by the user.

Figure 3A:
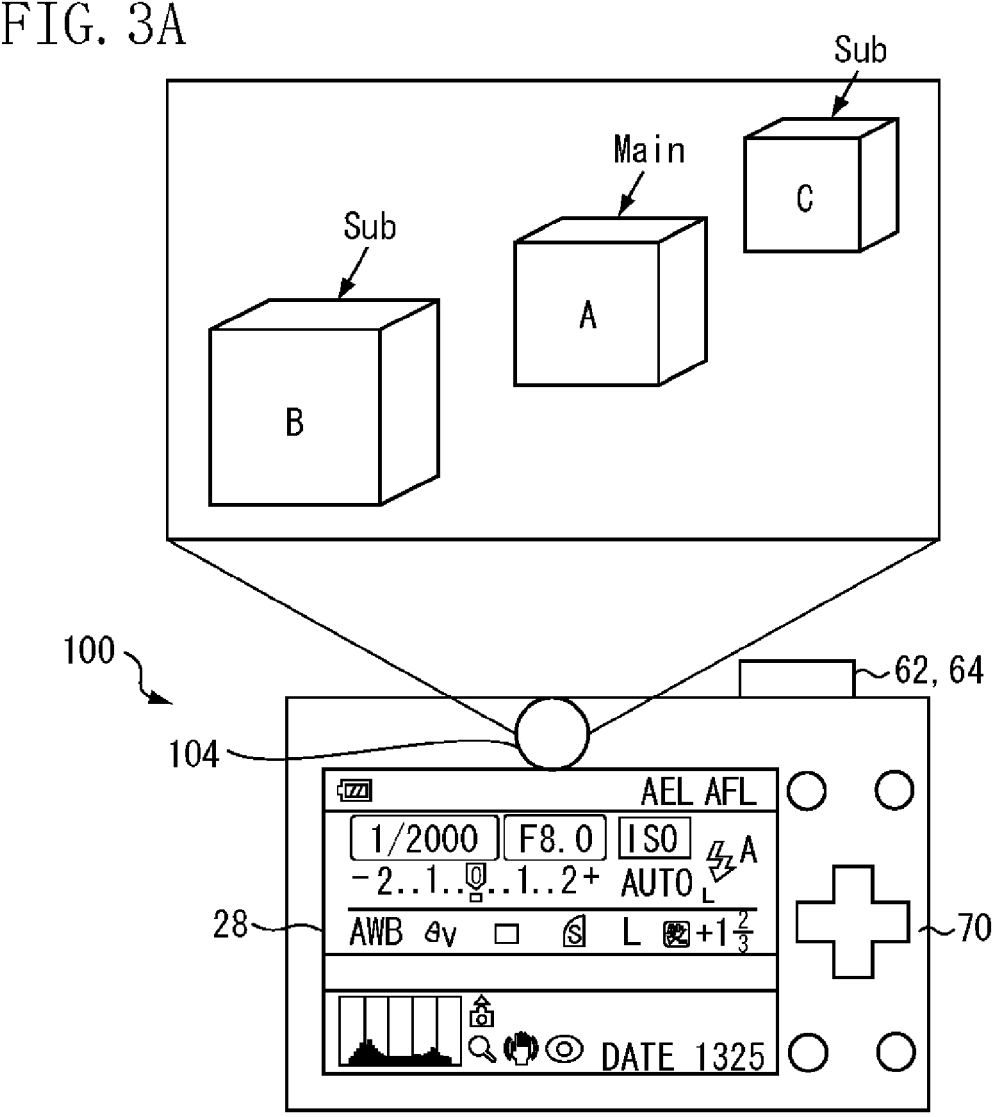
FIGS. 3A and 3B are schematic diagrams illustrating one example of photographing operation in the quick photographing mode.

Also, illustrated in FIG. 3A is the image display unit 28 of the camera 100, in which captured image data are not displayed. It is assumed that the user presses the shutter button after confirming three target objects of an object A, an object B, and an object C in a frame by using the optical finder 104. In this case, it is assumed that the user considers the object A as the object to preferentially focus on for taking a photograph.

Figure 3B:
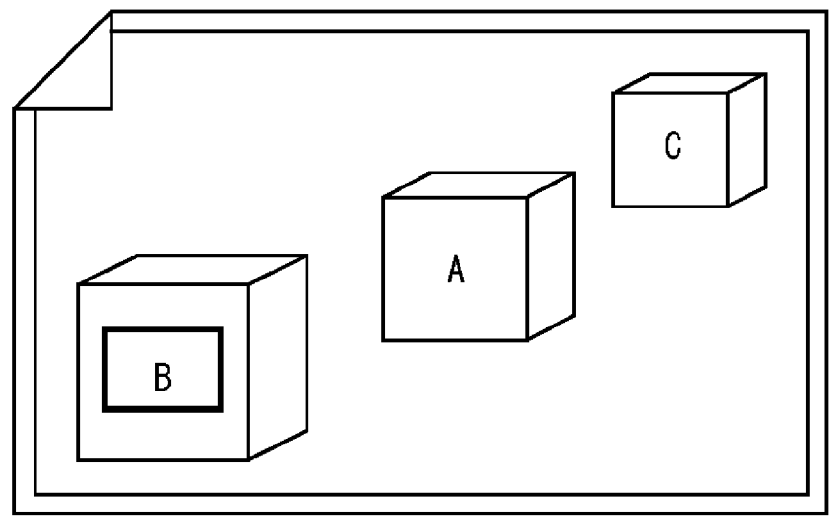

Illustrated in FIG. 3B is image data indicating the object on which the system control circuit 50 actually focuses on when the photograph is taken, in which the focused object is indicated by a solid line. As illustrated in FIG. 3B, the system control circuit 50 focuses on the object that is not the object which the user desires to preferentially photograph. In other words, the user has to take the photograph even when the position that the system control circuit 50 focuses on is not the position intended by the user, without confirming such position.

Hereinafter, operation processing of the camera 100 according to the present exemplary embodiment that enables a user to take a photograph after the user confirms face information detected by the camera, a focus position, and the like will be described with reference to FIGS. 4 to 7.

Figure 4:
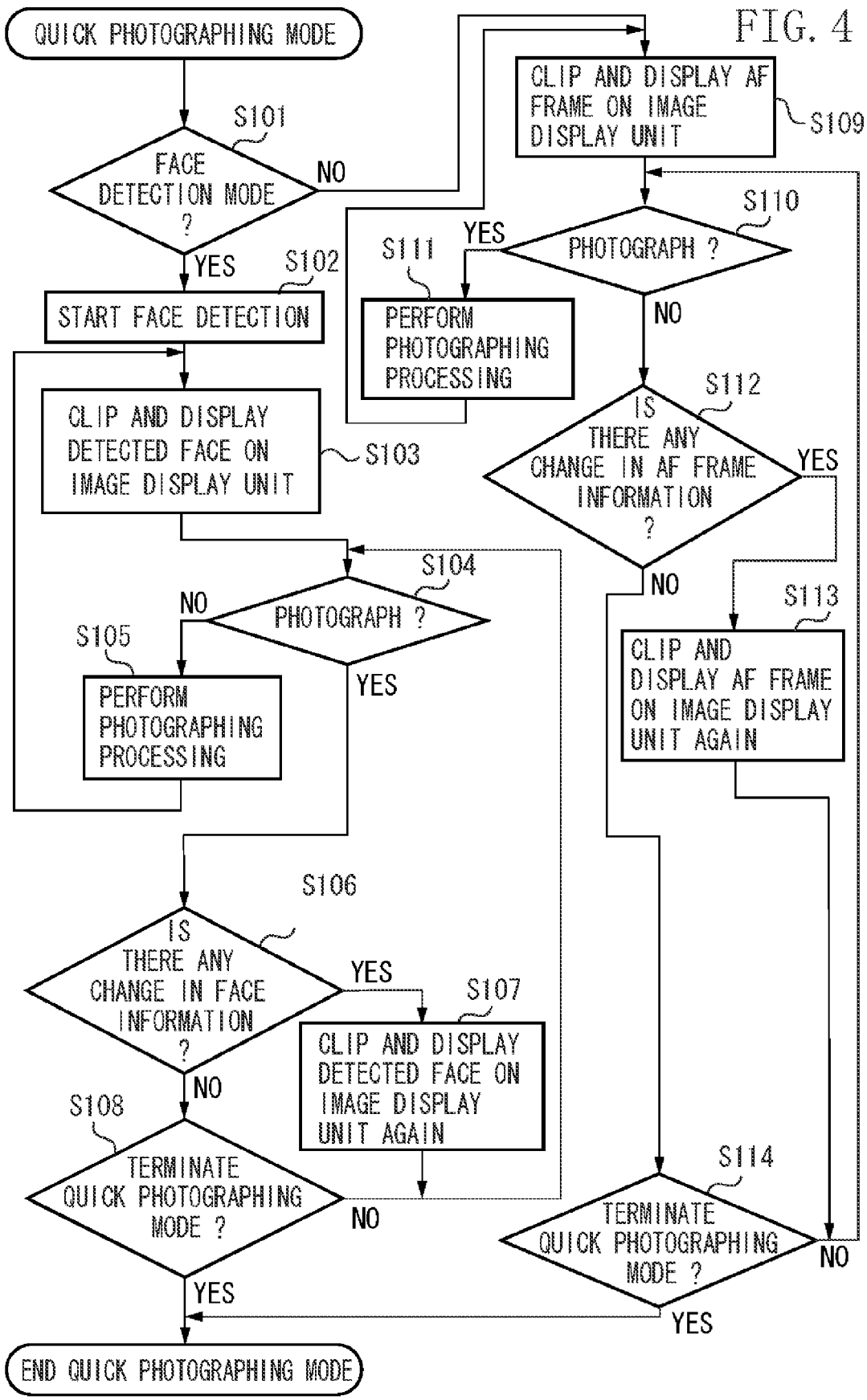
FIG. 4 is a flowchart illustrating a display control processing of the first exemplary embodiment.

FIG. 4 is a flowchart illustrating a display control processing in the quick photographing mode. The processing by the flowchart is realized when the system control circuit 50 executes a program stored in the memory 52, for example. The flowchart is started after the system control circuit 50 sets the camera to the quick photographing mode as the image capturing mode according to the operation on the mode dial switch 60 by the user.

In step S101, the system control circuit 50 determines whether a current camera is in a mode for detecting a face. The camera mode is set by the system control circuit 50 according to an operation by the user via the operation unit 70. When the current camera is in the mode for detecting a face, the processing proceeds to step S102.

In step S102, the system control circuit 50 performs detection of a face (face detection) as a specific object. The face detection means detection of face information such as a position and a size of a face, a number of faces, and a preference order of the faces from a captured image. In the present exemplary embodiment, the captured image is not displayed on the image display unit 28, but the image is continuously obtained in the same manner as in the ordinary standby state before photographing. The system control circuit 50 uses the captured image to perform real time face detection.

Figure 5:
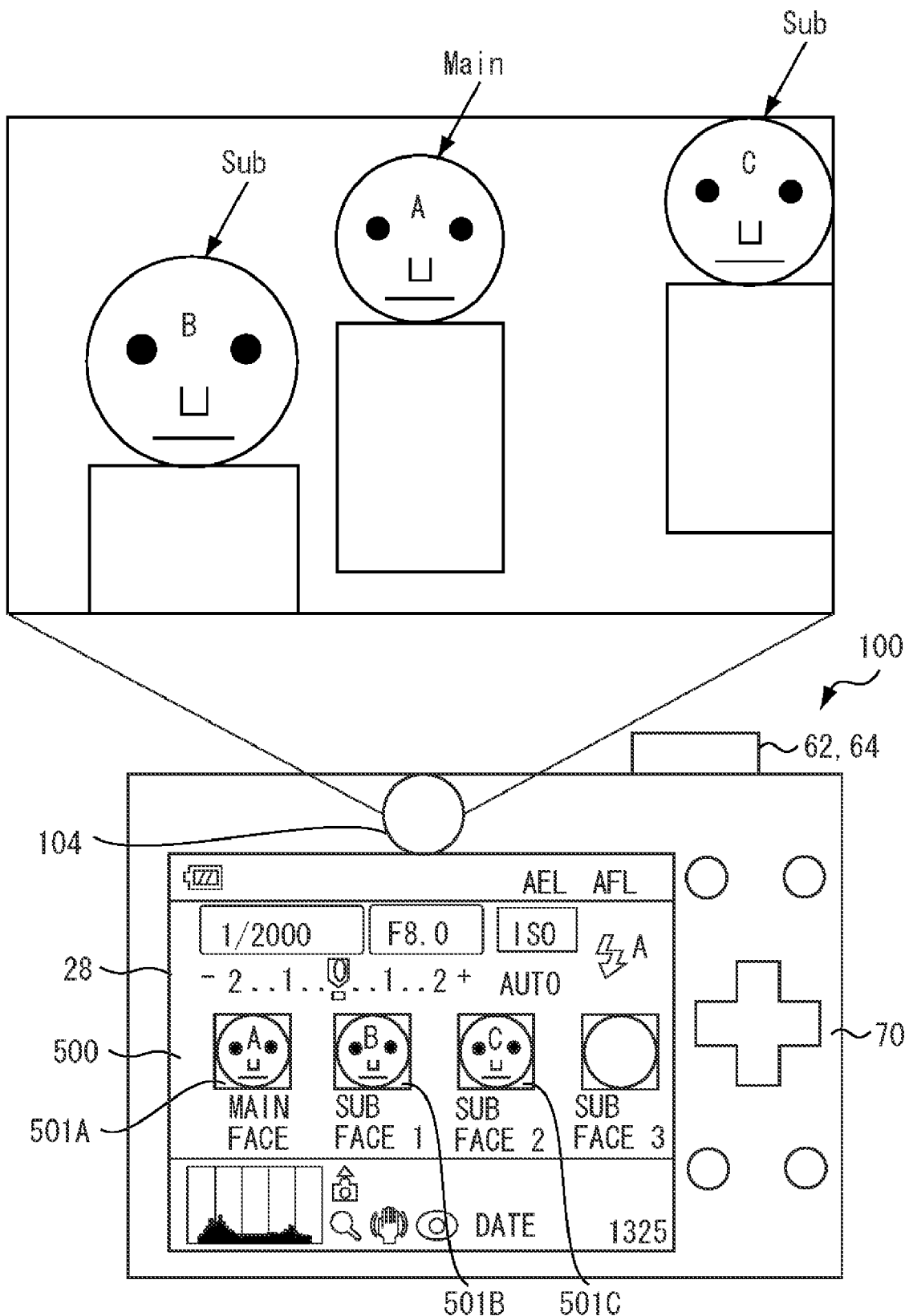
FIG. 5 is a schematic diagram illustrating one example of a display image of the first exemplary embodiment.

In step S103, the system control circuit 50 clips face images from the captured image and based on the face information obtained by the face detection, displays the face images at predetermined positions of the image display unit 28 as illustrated in FIG. 5. It is assumed that the user performs framing by using the optical finder 104 so that three persons of a person A, a person B, and a person C are included as illustrated in FIG. 5. As illustrated in FIG. 5, the system control circuit 50 displays the clipped face images 501A, 501B, and 501C in the face display region 500 of the image display unit 28. Here, the system control circuit 50 decides a preference order of the faces. This processing corresponds to one example of processing performed by a face order decision unit. Further, the system control circuit 50 displays the faces so that the user recognizes the preference order of the faces by arranging the face images in the decided order.

Also, the system control circuit 50 performs a resizing processing of the face images in the captured image so that the face images fit in a predetermined size of the face display region 500. Here, photographing information such as a shutter speed and an aperture value is displayed on a region other than that of the face images in the image display unit 28. When the system control circuit 50 decides the preference order of faces, the decision is made in such a manner that the face closest to the center of the captured image is given the highest preference or that the face in best conformity with the face information registered in the nonvolatile memory 56 or the like is given the highest preference.

In step S104, the system control circuit 50 determines whether a photographing operation has been performed by the user, i.e. whether the shutter button (SW2) 64 has been pressed down. If the photographing operation has been performed, the processing proceeds to step S105. In step S105, the system control circuit 50 performs photographing processing to return to step S103. Meanwhile, if it is determined that the photographing operation has not been performed, the processing proceeds to step S106.

In step S106, the system control circuit 50 determines whether the face information such as the number of faces and the preference order of faces is changed in the information obtained by the face detection due to detection of a new face or disappearance of the detected face. If there is the change, the processing proceeds to step S107. In step S107, the system control circuit 50 clips face images from a captured image based on newly obtained face information and displays the face images again at the predetermined positions in the image display unit 28, and the processing returns to step S104. Meanwhile, if there has not been any change in the face information in step S106, the processing proceeds to step S108.

In step S108, the system control circuit 50 determines whether the user has performed an operation of terminating the quick photographing mode byway of the mode dial switch 60. If the operation of terminating the quick photographing mode has been performed, the quick photographing mode is brought to an end. If the operation for terminating the quick photographing mode has not been performed, the processing returns to step S104.

Meanwhile, if the current camera is not in the mode for detecting a face in step S101, the processing proceeds to step S109.

In step S109, the system control circuit 50 performs the AF processing. In the present exemplary embodiment, the captured image is not displayed on the image display unit 28, but the image is continuously obtained in the same manner as in the ordinary standby state before photographing. The system control circuit 50 uses the captured image to perform the real time AF processing without restricting an operation speed and a range of the focus lens.

Figure 6:
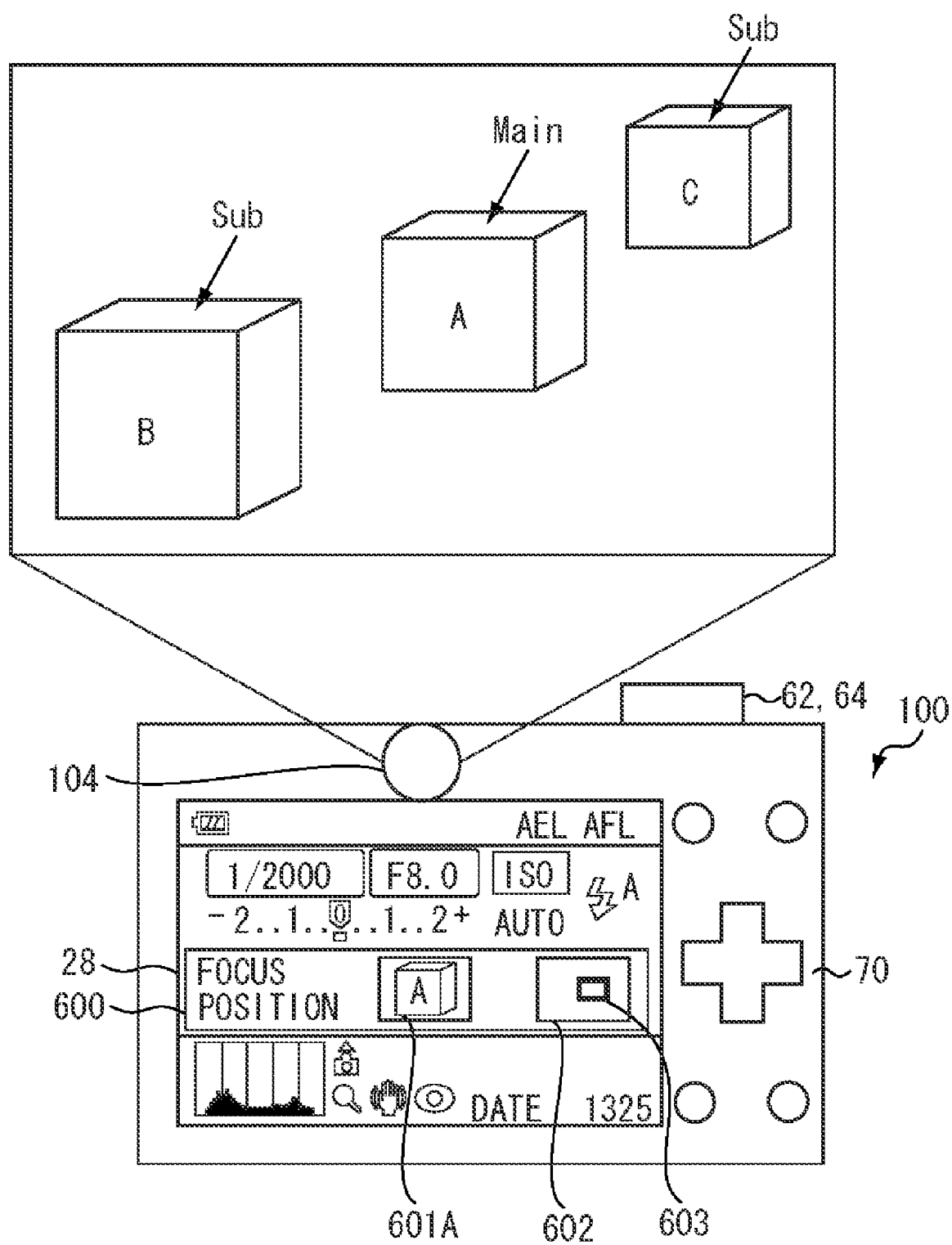
FIG. 6 is a schematic diagram illustrating one example of a display image of the first exemplary embodiment.

As a result of the AF processing, information of a region (AF frame) on which focusing is performed is detected. The system control circuit 50 clips an image inside the AF frame from the captured image based on the detected information and displays the AF frame image at a predetermined position as illustrated in FIG. 6. As illustrated in FIG. 6, it is assumed that the user performs framing by using the optical finder 104 so that three objects of an object A, an object B, and an object C are included as illustrated in FIG. 6. As illustrated in FIG. 6, the system control circuit 50 displays the clipped image 601A in a focus position display region 600. Here, the system control circuit 50 displays in addition an AF frame 603 that indicates a part of the captured image to which the displayed AF frame image corresponds, in a corresponding display region 602 of the image display unit 28. Also, the system control circuit 50 displays the AF frame image after performing resizing processing on the AF frame image so that the AF frame image fits in a predetermined size of the focus position display region 600. Image capture information such as a shutter speed and an aperture value is displayed in a region other than that of the AF frame image in the image display unit 28.

In step S110, the system control circuit 50 determines whether a photographing operation has been performed by the user, i.e. whether the shutter button (SW2) 64 has been pressed down. If the photographing operation has been performed, the processing proceeds to step S111. In step S111, the system control circuit 50 performs photographing processing and returns to step S109. Meanwhile, if it is determined that the photographing operation has not been performed, the processing proceeds to step S112.

In step S112, the system control circuit 50 determines whether there has been a change in the obtained AF frame information, such as a change from non-focus to in-focus in the AF frame due to the AF processing, and a change in AF frame position. If there has been the change, the processing proceeds to step S113. In step S113, the system control circuit 50 clips an AF frame image from a captured image based on newly obtained AF frame information and displays the AF frame image again at the predetermined position in the image display unit 28, then the processing returns to step S110. Meanwhile, if there has not been any change in the AF frame information, the processing proceeds to step S114.

In step S114, the system control circuit 50 determines whether the user has performed an operation of terminating the quick photographing mode byway of the mode dial switch 60. If the operation of terminating the quick photographing mode has been performed, the quick photographing mode is brought to an end. If the operation for terminating the quick photographing mode has not been performed, the processing returns to step S110.

As described above, according to the present exemplary embodiment, since the face information detected by the camera and the focus position are displayed on the image display unit, it is possible for the user to take a photograph after confirming the information even in the quick photographing mode.

The embodiment for displaying the face images or the AF frame image at the predetermined positions in the image display unit has been described as the first exemplary embodiment. In a second exemplary embodiment, display is performed according to positions of faces or a position of an AF frame in a captured image. The structure of the camera 100 and other processing will not be repeated since they are the same as those of the first exemplary embodiment.

Figure 7:
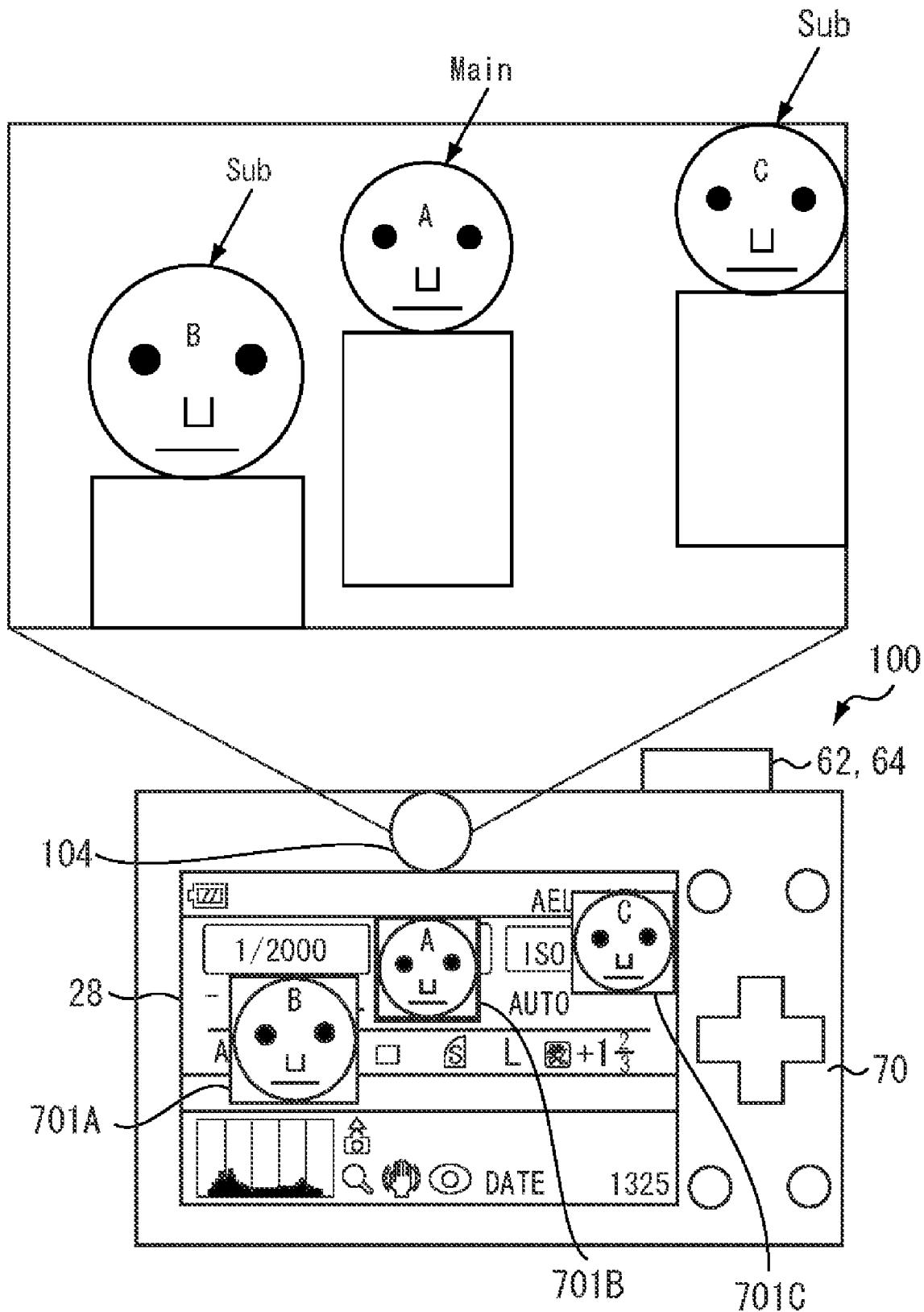
FIG. 7 is a schematic diagram illustrating one example of a display image of the first exemplary embodiment.

One display example in the image display unit 28 of the camera according to the present exemplary embodiment will be described with reference to FIG. 7. In FIG. 7, it is assumed that a user performs framing by using the optical finder 104 in the same manner as in FIG. 5 so that three persons of a person A, a person B, and a person C are included.

The system control circuit 50 displays on the image display unit 28 face images 701A, 701B, and 701C of the persons A to C, corresponding to positions of the faces in a captured image. Here, the system control circuit 50 displays the face image (main face) of the person on which the focusing is preferentially performed, with the image enclosed by a frame of a color different from those of the rest of faces or by a solid line frame as illustrated in FIG. 7 so that the user can distinguish the main face. In the display example illustrated in FIG. 7, the face images are displayed above image capture information such as a shutter speed and an aperture value. Likewise, in the case of an AF frame, the system control circuit 50 displays on the image display unit 28 an AF frame image corresponding to a position of the AF frame in the captured image.

As described above, according to the present exemplary embodiment, since the display on the image display unit is performed corresponding to the positions of the faces or the position of the AF frame in the captured image, the user can more intuitively grasp the positions of the faces or the position of the AF frame. Since the image capture information such as the shutter speed and the aperture value is hidden due to the displayed face images or the AF frame image in some cases, the display of image capture information may be avoided.

According to the first and the second exemplary embodiments, the timing for re-displaying the face images or the AF frame image at the predetermined positions in the image display unit 28 is limited to the case where there has been any change in face information or AF frame information. Therefore, since it is possible to perform the display by the image display unit 28 at a timing that is later than an ordinary frame rate, it is possible to reduce a load on the system control circuit 50. Also, as to the face image or the AF frame image to be displayed, since only the normally detected face image or the image in the normal focus region is updated based on the result of the face detection or the AF processing, there is the advantage that it is possible for the user to easily confirm information of the face image or the AF frame image.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-142720 filed Jun. 15, 2009, which is hereby incorporated by reference herein in its entirety.

What is claimed is:

1. An image capturing apparatus comprising:
an image capturing unit configured to capture an image of an object;
a display control unit configured to display the image captured by the image capturing unit on an image display unit;
a detection unit configured to detect a specific object from the image captured by the image capturing unit; and
a mode setting unit configured to set either one of a first display mode for continuously displaying the captured image on the image display unit by the display control unit, and a second display mode for displaying a capture parameter list and not displaying the captured image on the image display unit, wherein
the display control unit displays an image according to the detection result obtained by the detection unit on the image display unit when the second mode is set by the mode setting unit.

2. The image capturing apparatus according to claim 1, wherein the display control unit displays an image of a specific object that is clipped from the image captured by the image capturing unit and detected by the detection unit, on the image display unit when the second display mode is set by the mode setting unit.

3. The image capturing apparatus according to claim 2, wherein the display control unit displays the image of the specific object at a predetermined position on the image display unit.

4. The image capturing apparatus according to claim 3, wherein the display control unit displays a position of the specific object on the captured image in such a manner that a user can recognize the position.

5. The image capturing apparatus according to claim 2, wherein the display control unit displays the image of the specific object on the image display unit, corresponding to the position of the specific object in the captured image.

6. The image capturing apparatus according to claim 2, wherein the display control unit displays image capture information set to the image capturing apparatus together with the image of the specific object.

7. The image capturing apparatus according to claim 2, further comprising a resizing unit configured to resize the clipped image of the specific object, wherein
the display control unit displays the image resized by the resizing unit on the image display unit.

8. The image capturing apparatus according to claim 2, wherein
the detection unit detects a face from the image captured by the image capturing unit, and
the display control unit displays the clipped face image detected by the detection unit on the image display unit.

9. The image capturing apparatus according to claim 8, further comprising a face order decision unit configured to decide an order of a plurality of faces detected by the detection unit, wherein
he display control unit displays face images on the image display unit according to the face order decided by the face order decision unit.

10. The image capturing apparatus according to claim 2, wherein
the detection unit detects an in-focus object in the image captured by the image capturing unit, and
the display control unit displays an image of the in-focus object detected by the detection unit on the image display unit.

11. The image capturing apparatus according to claim 1, wherein
the display control unit updates an image according to the detection result obtained by the detection unit when the second mode is set by the mode setting unit and displays the updated image on the image display unit.

12. The image capturing apparatus according to claim 11, wherein the display control unit updates an image according to a detection result obtained by the detection unit if the detection unit detects a new face, the face that has been detected by the detection unit is no longer detected, or a number of faces detected by the detection unit has been changed, and displays the updated image on the image display unit.

13. The image capturing apparatus according to claim 11, further comprising a face order decision unit for deciding an order of a plurality of faces detected by the detection unit, wherein
the display control unit updates an image according to a detection result obtained by the detection unit if the order of the plurality of faces is changed by the face order decision unit, and displays the updated image on the image display unit.

14. The image capturing apparatus according to claim 11, wherein the display control unit updates an image according to a detection result obtained by the detection unit if a specific in-focus object is newly detected by the detection unit, and displays the updated image on the image display unit.

15. The image capturing apparatus according to claim 11, wherein the display control unit updates an image according to a detection result obtained by the detection unit if a position of the specific object detected by the detection unit has changed in the captured image, and displays the updated image on the image display unit.

16. The image capturing apparatus according to claim 1, wherein the second display mode is a quick photographing mode in which an operation speed of a focus lens is higher than the first display mode.

17. A control method for an image capturing apparatus including an image capturing unit configured to capture an image of an object, a display control unit configured to display the image captured by the image capturing unit on an image display unit, a detection unit configured to detect a specific object from the image captured by the image capturing unit, and a mode setting unit configured to set either one of a first display mode for continuously displaying the captured image on the image display unit by the display control unit and a second display mode for displaying a capture parameter list and not displaying the captured image on the image display unit, comprising:

determining a mode set by the mode setting unit; and displaying an image according to the detection result obtained by the detection unit with the display control unit when the second display mode is set by the mode setting unit.

* * * * *